Figure 1:
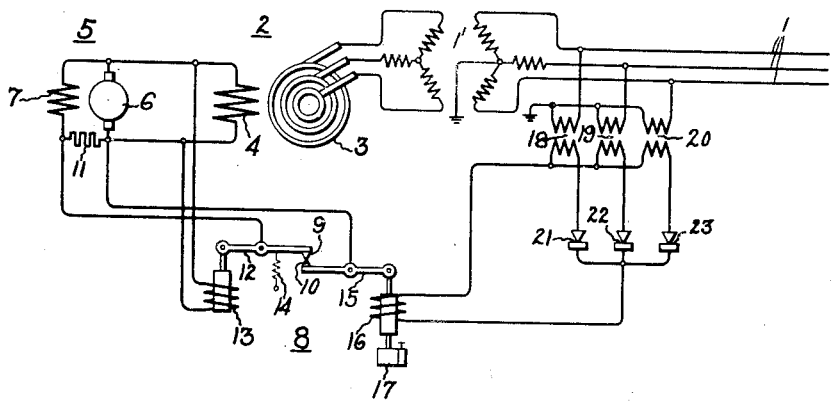

Sept. 22, 1931.   A. S. FITZ GERALD   1,824,714
ELECTRICAL REGULATOR
Filed May 12, 1930

Inventor:
Alan S. FitzGerald,
by Charles E. Tullar
His Attorney.

Patented Sept. 22, 1931

1,824,714

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRICAL REGULATOR

Application filed May 12, 1930. Serial No. 451,875.

My invention relates to electrical regulators and particularly to voltage regulators which are associated with polyphase synchronous apparatus.

The large scale generation and transmission of electrical energy is at present almost exclusively accomplished by constant voltage alternating current systems involving polyphase synchronous machines. The trend in the development of these systems is toward the transmission of increasing amounts of energy for each circuit over greater distances. However, the likelihood of the synchronous machines associated with such systems pulling out of step with each other as a result of disturbances on such systems increases with the phase angle between the voltages of these machines and this angle increases with the power transfer between the machines and also with increases in the impedance between the machines or, in other words, with increases in the length of the circuit connecting the machines. The trend is, therefore, toward the operation of such systems under conditions which approach their limits of stability.

In addition to being dependent upon the phase angle between their voltages, the torque at which synchronous machines pull out of step with each other is also dependent upon their degree of field excitation, it being greater as the excitation increases. The excitations of such machines are fixed, however, at any given conditions of torque or power factor by the voltage of the system. In practically all such systems the synchronous machines have their voltages maintained constant by automatic voltage regulators, which act to increase the excitations of the machines as the load increases. Until recently, however, the control elements of these regulators were responsive to only one of the phase voltages of the system, so that if a disturbance, such as a short circuit or ground, occurred on one of the other phases the regulators would not respond and loss of synchronism was a likely consequence.

In accordance with my invention I provide means for making a regulator responsive to the different phase voltages of a polyphase system without furnishing the regulator with as many separate control units as there are phases. My invention includes means which may be interposed between a polyphase circuit and the main control element of any ordinary regulator thereby to render such a regulator responsive to single phase variations in any one or more of the electrical quantities of the circuit, for example the voltage, as well as to render it responsive to balanced variations in the regulated quantity.

An object of my invention is to provide a new and improved electrical regulator for connection to polyphase electrical circuits.

Another object of my invention is to provide novel means for rendering the control element of a regulator responsive to an electrical quantity which is proportional to the mean or polyphase regulated quantities of a polyphase circuit.

A further object of my invention is to provide novel means for rendering the control element of an electrical regulator positively responsive to decreases in any one or more of the polyphase regulated quantities of a polyphase circuit.

My invention will be better understood from the following description taken in connection with the accompanying drawings and its scope will be pointed out in the appended claims.

Figure 2:
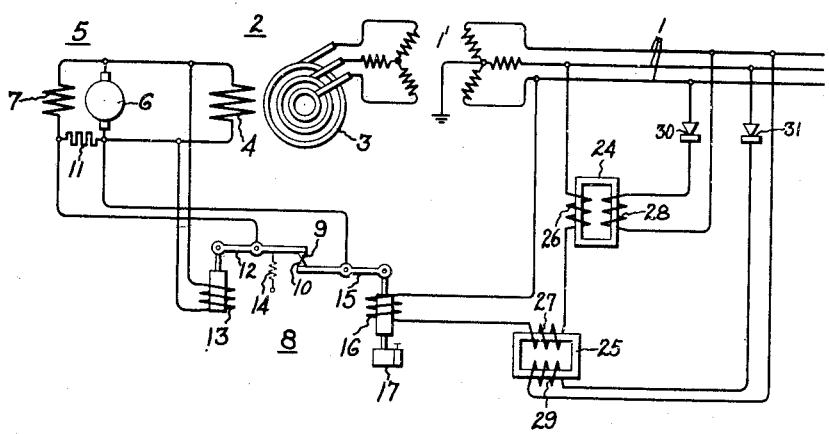

In the drawings, like characters of which refer to similar elements in the two figures, Fig. 1 illustrates diagrammatically an embodiment of my invention in which the control element of a regulator is energized in accordance with variations in an electrical quantity whose magnitude is proportional to the mean of one of the electrical conditions of the phases of a polyphase alternating current circuit, while Fig. 2 illustrates diagrammatically another embodiment of my invention in which the control element of an electrical regulator is responsive to changes in both directions from normal of an electrical condition of one of the phases of a polyphase alternating current circuit and is also responsive to changes from normal, in one direction only, of an electrical condition of the other phases of the polyphase circuit.

Referring now to Fig. 1. A three phase circuit 1, one of whose electrical conditions is to be regulated, is connected through a transformer 1; whose secondary winding is star connected with its neutral grounded, to a three phase dynamo electric machine 2 having an armature 3 and a field winding 4. Machine 2 may be any type of synchronous machine and in the embodiment illustrated will be assumed to be an ordinary synchronous generator. An exciter 5, having an armature 6 and a field winding 7, is connected to field winding 4. For regulating any one of the electrical conditions of machine 2 or of circuit 1, to which it is connected, I provide a regulator 8 which may be of any type, and which in the embodiment illustrated is a voltage regulator of the Tirrill type. This regulator, whose construction and mode of operation are well known in the art, controls the excitation of the regulated machine by means of a pair of cooperating contacts 9 and 10 which intermittently make and break a circuit that controls a short circuit around a resistance 11, usually in the exciter field circuit as shown, thereby to hold an average value of exciter field current. Contact 9, which is usually referred to as the vibratory or anti-hunting contact is moved through the usual system of pivoted levers 12 by an anti-hunting coil 13, which is connected across the exciter 5. A spring 14 serves to oppose the pull of coil 13. Contact 10, which is usually referred to as the main control contact is moved by the usual system of pivoted levers 15 by a main control solenoid or element 16. A dash pot 17 is connected to the lever system 15 so as to check any tendency for this system to vibrate.

In the past, the usual practice when using a regulator as a voltage or current regulator has been to connect its control element to be responsive to the voltage or current of one phase only of the polyphase circuit. As this however does not give a true index of the condition of the circuit because of the not infrequent occurrence of unbalanced conditions I have provided a network which is interposed between the regulated polyphase circuit and the main control element whereby the latter responds to an electrical quantity which varies in proportion to variations in the mean value of the regulated condition of the phases of the circuit. As shown this network comprises a plurality of transformers 18, 19 and 20, preferably potential transformers, with their primary windings star connected, the neutral being preferably grounded, and their secondary windings parallel connected through individual rectifiers 21, 22 and 23 to the main control element 16. These rectifiers may be of any suitable type and in the illustrated embodiment are diagrammatically represented as of the well known dry disc copper-copper oxide type. With this arrangement each secondary winding will carry a current proportional to one of the phase voltages of the circuit so that the control coil 16 will carry a direct current which is proportional to the sum or mean value of these voltages. I wish to emphasize at this point that the particular network which has been described is merely illustrative and that various other ways of connecting the transformers will occur to those skilled in the art, such as connecting the primary windings of the transformers to be responsive to the current in the lines or mesh connecting them rather than star connecting them, the latter connection being preferred as the voltages across each primary winding will be less, or connecting the secondary windings in series rather than in parallel and that these connections may be made without departing from my invention in its broader aspects.

The operation of the embodiment of my invention illustrated in Fig. 1 is as follows. Assume that machine 2 is being driven by a suitable prime mover (not shown) and that stable balanced conditions exist on circuit 1. Under these circumstances contact 10 will be stationary at such a position that the ratio of time open to time closed of contacts 9 and 10 will hold the proper excitation of the exciter and hence of machine 2 to maintain normal voltage on circuit 1. The action of the anti-hunting element will be as follows, as contacts 9 and 10 engage, resistance 11 is short-circuited thereby increasing the excitation of machine 5 to raise the voltage of the main generator. This will increase the pull of coil 13 with the result that contact 9 leaves contact 10, thus reinserting resistance 11 in the field circuit of the exciter and decreasing its excitation and the pull of coil 13. This action is exceedingly rapid and due to the time constant of the field 4 does not produce any appreciable pulsation in the alternating current voltage.

Should contact 10 rise, as a result of a decrease in the energization of solenoid 16, it will require a higher energization of coil 13 to cause contact 9 to leave contact 10 because of the greater tension of spring 14. Thus the regulator acts to increase the excitation of machine 2 when the energization of solenoid 16 is lessened. In a similar manner, an increase in the excitation of solenoid 16, causes contact 10 to descend thereby to decrease the excitation of machine 2.

It might be well to note at this point that in active practice regulators of the type shown employ a relay between their vibratory contacts, and the resistance in the exciter field circuit in order to reduce to a minimum the current which these contacts must break and also the spring connected to the anti-hunting system is in actual practice a plurality of springs, usually four in number, arranged to pick up at different positions of the system so as to give the proper position-force characteristic. For the sake of simplicity and clearness these parts have however been omitted.

Considering now the action of the network connecting the control element of the regulator to circuit 1. If the voltage of all the phases of circuit 1 decreases, as through the application of a balanced three phase load to it, the current in each secondary winding of transformers 18, 19 and 20 will decrease proportionally thereby to decrease the current in the control element or solenoid 16 with the result that the regulator 8 acts to increase the excitation and hence the voltage of machine 2. Similarly a balanced rise in voltage on circuit 1 will cause an increase excitation of element 16 thereby to cause regulator 8 to decrease the excitation and hence the voltage of machine 2. If now the voltage of one of the conductors of circuit 1 should decrease, as a result of a single phase ground, for example, the voltage across the primary winding of the transformer connected to this conductor would drop thereby decreasing the current in its secondary winding with the result that the total direct current flow in the control element 16 would decrease thereby to increase the excitation of the generator 2.

In the modification of my invention illustrated in Fig. 2 I have shown a network interposed between the control element 16 of regulator 8 and the polyphase circuit 1 which gives a positive decrease in excitation of the control element as a result of the decrease in voltage on any one or more of the phases of circuit 1. As shown, this arrangement comprises connecting the control element 16 to be directly responsive to the voltage of one of the phases of circuit 1, the circuit of this control element containing variable impedance means responding to a decrease in voltage on any one or more of the remaining phases. In the illustrated embodiment this variable impedance means comprises a pair of saturable core reactors 24 and 25 having alternating current coils 26 and 27 in series with control element 16 and direct current saturating windings 28 and 29 connected to be responsive to variations in the voltage of the remaining phases of circuit 1 through rectifying means 30 and 31 respectively. No particular type of rectifier is essential, the drawing illustrating diagrammatically dry disc copper-copper oxide rectifiers. It should, of course, be borne in mind that, while coils 28 and 29 and control element 16 are shown directly connected across the lines of circuit 1, in actual practice on high voltage circuits it would be desirable to employ potential transformers. It will also occur to those skilled in the art to which this invention pertains that these elements might also be connected to be responsive to current rather than voltage, if it is the former that is to be regulated, without departing from my invention in its broader aspects. It should also be remembered that the drawings are merely diagrammatic and that in actual practice reactors of the type which have no inductive relation between the direct and alternating current windings will be used. Many reactors of this type are known in the art, some of the more well known types of which are disclosed in Letters Patent No. 720,884, Burgess et al, February 17, 1903.

The operation of the embodiment of my invention illustrated in Fig. 2 is as follows. Reactors 24 and 25 are so constructed that when a voltage is impressed across their direct current windings which corresponds to the normal voltage of circuit 1, their cores will be operated just above the knees of their respective magnetization curves or in other words their cores will just be saturated. The ohmic impedance of these reactors will therefore be low. If now the voltage of one of the phases energizing the direct current saturating windings of these reactors should fall, the core of the respective reactor would be operated below the knee of its saturation curve with the result that its ohmic impedance would greatly increase thereby to decrease the current in control element 16 and increase the excitation of machine 2, through the action of the regulator 8 as explained above. A decrease or increase in voltage between the lines across which the control element is connected will of course cause corresponding changes in the energization of this element. It will thus be seen that in this modification means are provided for giving a positive action to the regulator in response to a decrease in the voltage on any one of the phases of circuit 1, while the action of the regulator in response to increases in voltage in circuit 1 will be as heretofore.

While I have shown and described particular embodiments of my invention it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a polyphase alternating current circuit, an electrical regulator having a control element, and means including a plurality of rectifiers for controlling the energization of said control element in accordance with an electrical condition of different phases of said circuit.

2. In combination, a polyphase alternating current circuit, an electrical regulator having a control element, a plurality of rectifiers energized respectively in accordance with an electrical condition of the phases of said circuit, said rectifiers being connected to said control element.

3. In combination, a polyphase alternating current circuit, an electrical regulator having an electrically operable control element, a purality of transformers having their primary windings connected to said circuit so that their respective energizations will vary in accordance with variations in an electrical condition of the respective phases of said circuit, a plurality of rectifiers and means connecting the secondary windings of said transformers to said control element through said rectifiers.

4. In combination, a three phase alternating current circuit, a voltage regulator having an electromagnetically operable control element, three transformers having their primary windings star connected to said circuit, the secondary windings of said transformers being connected to said control element in series with individual rectifiers.

5. In combination, a polyphase alternating current circuit, means including an electrical regulator for controlling an electrical condition of said circuit, said regulator having an electrically operable control element and means for energizing said control element in accordance with the sum of a plurality of direct current electrical quantities, each of said quantities varying respectively in accordance with variations in the magnitude of an electrical condition of the different phases of said polyphase circuit.

6. In a regulating system, in combination, a polyphase alternating current circuit, a polyphase synchronous machine connected to said circuit, a regulator for varying the excitation of said machine in accordance with variations in an electrical condition of said circuit, said regulator having an electrically operable control element, and means connecting said control element to said circuit so that the energization of said control element is proportional to the mean value of the polyphase regulated condition of said circuit.

7. In a voltage regulating system, in combination, a polyphase alternating current circuit, a polyphase synchronous machine connected to said circuit, an exciter for said synchronous machine, a vibratory contact regulator connected to control the excitation of said exciter, said regulator having a main control element, a plurality of transformers having their primary windings star connected to said circuit, a separate rectifier connected to each of the secondary windings of said transformers and means connecting each of said secondary windings and its rectifier to said control element.

8. In combination, a polyphase alternating current circuit, an electrical regulator having a control element connected to be responsive to an electrical condition of one of the phases of said circuit, and means associated with each of the other phases of said circuit for varying the impedance of the circuit including said control means with variations in the coirresponding electrical conditions of the other phases of said polyphase circuit.

9. In combination, a polyphase alternating current circuit, an electrical regulator having a control element connected to be responsive to an electrical condition of one of the phases of said circuit, a plurality of variable impedances connected in series with said control element and means associated with the remaining phases of said circuit and with said impedances for varying the magnitudes of the latter with variations in said electrical condition of said other phases.

10. In combination, a polyphase alternating current circuit, an electrical regulator having a control element connected to be responsive to an electrical condition of one of the phases of said circuit, a plurality of saturable reactors connected in series with said control element, and means for varying the magnetic saturation of each of said reactors with variations in said electrical condition of a different one of the remaining phases of said circuit.

11. In combination, a polyphase alternating current circuit, means including an electrical regulator for varying an electrical condition of said polyphase circuit, said regulator having an electrically operable control element connected to be responsive to variations in said condition of one of the phases of said polyphase circuit, magnetically saturable impedance means connected to control the current flow in said control element, and means connecting said impedance means to the remaining phases of said circuit so that when the electrical condition of any of said remaining phases corresponding to the electrical condition of the phase to which said control element is responsive decreases in magnitude the saturation of the magnetic circuit of said impedance will fall below the knee of its magnetization curve.

12. In a regulating system, a polyphase alternating current circuit, a control circuit connected to be responsive to variations in the magnitude of an electrical condition of one of the phases of said circuit, and means for increasing the impedance of said circuit whenever an electrical condition of any of the remaining phases changes in magnitude in one direction only from a predetermined value.

13. In combination, a polyphase alternating current circuit, a voltage regulator having a control element connected to be responsive to the voltage of one of the phases of said circuit, a plurality of saturable reactors each having an alternating current coil and a direct current saturating coil, said alternating current coil being connected in series with said control element, said direct current saturating coil being connected through rectifying means to be responsive respectively to the voltages of the remaining phases of said polyphase circuit.

14. In a regulating system, in combination, a polyphase alternating current circuit, a polyphase synchronous machine connected to said circuit, a regulator for controlling the excitation of said synchronous machine, said regulator having a control element connected to be responsive to an electrical condition of one of the phases of said polyphase circuit, an impedance in series with said control element, and means responsive to a corresponding electrical condition of another phase of said polyphase circuit for varying the magnitude of said impedance.

15. In a regulating system, in combination, a three phase alternating current circuit, a three phase synchronous alternating current generator connected to said circuit, an exciter connected to said alternator, a vibratory contact voltage regulator for controlling the excitation of said exciter, said regulator having a control element connected to be responsive to the voltage of one of the phases of said circuit, a pair of saturable reactors each having a core of magnetic material on which is wound an alternating current coil and a direct current saturating coil, said alternating current coil being connected in series with said control element, said direct current saturating coil being connected through rectifying means to be responsive respectively to the voltages of the remaining phases of said three phase circuit, the cores of said reactors being worked just above the knees of their respective magnetization curves when the voltages of the phases to which they are connected are normal.

In witness whereof, I have hereunto set my hand this 7th day of May, 1930.

ALAN S. FITZ GERALD.